Patented Sept. 30, 1930

1,777,161

UNITED STATES PATENT OFFICE

ARTHUR BIDDLE, OF TRENTON, NEW JERSEY, ASSIGNOR TO UNITED PRODUCTS CORPORATION OF AMERICA, A CORPORATION OF DELAWARE

WATER-RESISTING ADHESIVE COMPOSITION OF MATTER

No Drawing.  Application filed July 21, 1927. Serial No. 207,582.

This invention relates to the treating of inaqueous flexible gummy colloidal substances, with an alkaline earth hydroxide and a water-soluble compound of phosphorous.

I have found that if an inaqueous and normally water-resisting flexible gummy collodial substance is inaqueously dispersed with the aid of, or the aqueous dispersion of said colloidal substance is treated with a water-absorbing or water-soluble or water-miscible colloid that has been treated with an alkaline earth hydroxide and a water-soluble neutral or alkaline phosphorous compound that the inaqueous colloid or dispersion thereof so treated will possess many new and desirable properties.

When a substance like rubber latex is treated with a hydrophillic colloid such as casein which has been previously subjected to the action of calcium hydroxide and tri-sodium phosphate with or without other casein solvent substances, the glue obtained thereby is exceedingly fluid, of long life and of not too caustic action on materials glued or made with it. Further, the glues or adhesive-like substances so made are not caustic or harmful to the skin of the operator using them.

Glues made by combining inaqueous flexible colloids with strong adhesive water-soluble colloids that have been treated with an alkaline earth hydroxide, particularly calcium, and a neutral or alkaline phosphate, preferably tri-sodium phosphate, make good joint and veneer wood glues that are water-resisting, more or less shatter-proof, element resisting and physically strong.

By alkaline earth hydroxides are meant the hydroxides of such as calcium, barium, strontium or magnesium, but because of its commonness, alkalinity and greater solubility, calcium is to be preferred. Calcium hydroxide gives the best results when a strong, long life, fluid adhesive composition is preferred. The oxides of such substances are also to be included in the meaning and the field of my disclosure, as the oxides when used in the presence of water will generally be changed to hydroxides. Further, the oxides or the hydroxides may be the natural earthy substances or they may be the products of chemical processes, as for instance, the precipitation of calcium hydroxide from other calcium compounds. The alkaline hydroxides as produced from calcined marine shells or bony matter may also be advantageously utilized in my invention.

The inaqueous and water-resisting gum colloids such as chicle or chicle substitutes, balata, gutta-percha, rubber or rubber containing substances either natural or synthetic may be used in their crude or gum form and be aqueously dispersed by several methods, such as for example, dissolving in an organic solvent like gasolene, kerosene, heavy oils, benzol, xylol, or carbon-tetrachloride. The solution so made may then be aqueously dispersed or emulsified in water by using a dispersing medium treated or untreated with an alkaline earth hydroxide. Or the inaqueous gum colloid may be brought into the aqueous dispersion by masticating therewith a dispersing agent in the presence of water. If obtainable, the inaqueous colloids may be and are preferably used in their initially aqueously dispersed state either artificial or natural. A good example of a natural aqueous dispersion of a flexible inaqueous colloid is rubber latex. This latex is generally preserved with about 3% of ammonia, but other preservatives may be used as also various degrees of concentrated latex.

By treating water-soluble colloids like the various commercial grades of casein, animal or marine glues, starches, and particularly cassava starch, gum arabic, tragacanth or karaya, saponin or Irish moss, blood albumen or other adhesive albumens, with an alkaline earth hydroxide in combination with a neutral or alkaline phosphate and particularly tri-sodium phosphate, the said water-soluble colloids seem to break down or in many cases become thinner when in solution than if not so treated. Then when the aqueous dispersion of the inaqueous colloid is treated with or added to the water-soluble colloid so treated, the inaqueous substance in dispersed phase is more stable, less likely to form "rubber or rubber-like balls," and the adhesiveness is increased according to the adhesive strength of the water-soluble colloid with the added properties of greatly increased water-resistance and flexibility. The addition of soaps treated as herein described and in combination with an inaqueous colloid in aqueous dispersion make the composition more adaptable as an adhesive for the plastic and sizing arts. The same is true of inert dispersing mediums like colloidal clays such as bentonite. They add increased plasticity and viscosity to the aqueous dispersion of the inaqueous colloid. Water-absorbing resin oils, water-soluble oils like turkey red oil, and others are adaptable for use in my improved composition. Water-soluble silicates such as sodium silicates may be added to the aqueous dispersions or parts thereof. But in so adding care should be taken to avoid coagulation, precipitation or curdling of the aqueous dispersion or parts thereof or the various ingredients thereof. If this coagulation is undesirable it may be avoided by first making the dispersion with the aid of water-soluble colloid that is compatible to the other ingredients of the dispersion and also to the silicate or solution thereof. Or the silicate may be mixed with or treated with a strong alkali to increase its alkalinity. Such water-soluble and compatible colloids are for example, casein, glue or starch, preferably in an alkaline condition, as acid substances tend to precipitate insoluble silicates from a composition containing soluble silicious matter.

If the alkaline earth hydroxide and the composition is strongly alkaline even an acid phosphate may be used in the composition if undesirable coagulation does not occur. Also the phosphate or other basic compounds may be double or triple salts such as made by the combining therewith of fluorides, borates, carbonates, sulphites, sulphides and many others.

As an example of a strong glue will be given the following:

| | Parts by weight |
|---|---|
| Rubber latex (approximately 35% rubber) | 100 |
| Casein | 100 |
| Calcium hydroxide | 22 |
| Tri-sodium phosphate | 14 |
| Water (to dissolve the above) | 400 |

It is to be understood that the proportion in the above example as well as those to follow are given as a workable guide and may be changed to suit conditions and the particular art wherein the composition is to be used.

When a strong adhesive is not desired but which will be capable of acting as a binder for minute material used in plastic compositions or in sizings, the following will be adaptable:

| | Parts by weight |
|---|---|
| Chicle (dissolved in linseed oil) | 50 |
| Animal glue (50% aqueous solution) | 100 |
| Cassava starch (dry weight) | 10 |
| Water | 70 |
| Calcium hydroxide | 10 |
| Magnesium oxide | 5 |
| Tri-sodium phosphate | 5 |
| Mono-sodium phosphate | 3 |

The chicle-linseed oil combination may be dispersed in the glue solution or with the aid of the cassava starch and the other ingredients. It is preferable to break down the cassava starch by adding water to it and then adding the other solvent ingredients to it and then disperse the chicle in the composition. Starches treated with acid substances like oxalic acids, sodium oxalate, or alkalies make the stronger adhesives.

When strong alkaline glues are not objectionable, the alkaline earth hydroxide may be increased to twice or three times the amount of the water-soluble colloid or colloids if there be a plurality of water-soluble colloids. Further other substances like sodium fluoride, sodium of potassium carbonate, sodium hydroxide, water-soluble metallic borates sodium molybdate, or sodium tungstate may be added to the composition to also react with the alkaline earth hydroxide and form stronger, if more alkaline, adhesives. An example of other chemicals being added is herewith given:

| | Parts by weight |
|---|---|
| Casein (commercial) | 100 |
| Calcium hydroxide | 25 |
| Tri-sodium phosphate | 5 |
| Sodium carbonate | 5 |
| Sodium hydroxide | 2 |
| Sodium chloride | 3 |
| Copper chloride | 3 |
| Sodium fluoride | 5 |
| Water (to dissolve the above) | 325 |

The above ingredients are dissolved in the water and then added to: rubber latex, 125 parts by weight.

If a glue of not as great adhesive strength is wanted, to the above composition may be added silicate of soda (about 40% solids) 200 parts by weight.

Preserving agents of which copper chlorid is one may be added to the compositions or ingredients thereof. Other such agents are sodium formate, sodium benzoate, beta or alpha napthol, sodium salicylate or the preserving creosote compounds. Oily or essential substances like terpeneol, cedar oil or oil of bitter almonds not only help to preserve but gives the composition a sweet scent.

In order to make the water-soluble colloids still more water-resisting in the finished composition it is desirable to add to the composition or to the ingredients thereof and before combining of them takes place, insolubilizing agents to insolubilize the water-soluble colloids that are insolubilizable (colloidal clays and the like are not termed insolubilizable), and thereby increase their resistance to water in their dehydrated condition. Among these insolubilizing agents are such as formaldehyde, paraformaldehyde, hexamethylenetetramine calcium zinc or copper chlorides, potassium or sodium chromate, alums, tannic acid or compounds of tannic acid. From one to five percent (based on the dry weight of the water-soluble colloid to be insolubilized) is generally sufficient to accomplish the insolubilization of the colloid.

In the examples given only the basic adhesive composition is given, but it is to be understood that in every art and industry there are countless filling, coloring, and other agents that may be added to a composition to satisfy definite needs of that art or industry, but which addition does not in the least require further inventive research if their properties are well known to the art. Of these materials will be mentioned, carbon and other blacks, zinc oxide, the carbonates and stearates of sodium, calcium, magnesium, etc. Or fibrous material like cotton, cellulose, shredded wood, cork or leather, oils like linseed, cotton seed, china wood, resins, waxes and the like may be added to or dispersed in the composition to give it "slip," gloss and hardness and many other properties.

When the compound contains rubber vulcanizing and/or accelerating agents may be added thereto and the substantially dehydrated and finished article may then be vulcanized or the various cold cures may be used.

The word adhesive as used herein is meant in its broadest sense and may be co-hesive or ad-hesive in nature, as meaning dry or liquid substances. It may mean a strong or comparatively weak glue, a sizing or a coating adhesive. It may be used as a strong wood glue or used as the base to make plastic materials or objects, that is, it may adhere, glue, hold, fix, bind or occlude countless small or finely ground particles or fibrous matter.

While I have herein described some particular compositions embodying my invention and methods of producing the same, and also mentioned some of the arts in which my invention may be utilized, it is to be understood that the invention is not limited to those arts, or to the precise methods, ingredients or proportions mentioned.

Having thus described my invention, I claim and desire to protect by Letters Patent of the United States:

1. An adhesive composition comprising rubber latex, casein, calcium hydroxide and tri-sodium phosphate.

2. An adhesive composition comprising rubber latex, casein, calcium hydroxide, tri-sodium phosphate and alum.

3. An adhesive composition comprising rubber latex, casein, calcium hydroxide, tri-sodium phosphate, sodium fluoride, and water.

4. An adhesive composition comprising rubber latex, casein, calcium hydroxide, tri-sodium phosphate and an insolubilizing agent for said casein.

In witness whereof I hereunto set my hand this 19th day of July, 1927.

ARTHUR BIDDLE.